United States Patent [19]

Higgins et al.

[11] Patent Number: 5,208,910
[45] Date of Patent: May 4, 1993

[54] MENU DRIVEN AND METHOD SYSTEM FOR INFORMING WHICH PAST SELECTIONS HAVE CAUSED DISABLED ACTIONS

[75] Inventors: Patricia E. Higgins, Gaithersburg; Ta-Jen Hu, Rockville; Joseph W. Potts, Bethesda, all of Md.; William J. Wyatt, Lowell, Mass.

[73] Assignee: International Business Machines, Armonk, N.Y.

[21] Appl. No.: 883,909

[22] Filed: May 12, 1992

[51] Int. Cl.⁵ .................................... G06F 15/403
[52] U.S. Cl. ........................................... 395/156
[58] Field of Search .................................. 395/156

[56] References Cited

U.S. PATENT DOCUMENTS

| | | |
|---|---|---|
| 4,509,046 | 4/1985 | Yamada . |
| 4,556,954 | 12/1985 | Advani et al. . |
| 4,742,473 | 5/1988 | Shugar et al. . |
| 4,763,356 | 8/1988 | Day et al. ............... 377/368 |
| 4,823,283 | 4/1989 | Diehm et al. . |
| 5,040,131 | 8/1991 | Torres ..................... 364/521 |

OTHER PUBLICATIONS

IBM Technical Disclosure Bulletin, Entitled "The Training Displaywriter", to Boor et al., vol. 27, No 1A, Jun. 1984, pp. 267–272.
Research Disclosure N030780, Nov. 1989, Havant GB, p. 837, "User Interface for Dynamic Change of Action Bar and Pulldown Content Based Upon Attributes of . . .".
Byte, Jan. 1989, pp. 223–228, Shammas N. C., "Quick Basic Comes to the Macintosh."
Macintosh–Macintosh SE, Apple Computer, Inc. ©1987 pp. 2, 22, 27, 32, 33, 57, 59.
Macintosh—Hypercard User's Guide, Apple Computer, Inc. ©1987, pp. 16, 50, 51, 59, 70, 116, 153.
Apple Computer, Macintosh System Software User's Guide, ©1988, pp. 27, 32, 52f, 56, 88, 180f.
Apple Computer, Macintosh SE/30 Owner's Guide, ©1988, pp. 24–32.
Apple Computer, Inside Macintosh vol. I, ©1985, pp. 1-51f.

Primary Examiner—Dale M. Shaw
Assistant Examiner—Lance L. Barry
Attorney, Agent, or Firm—Jeffrey S. LaBaw; John D. Flynn

[57] ABSTRACT

A method of informing a user of a data processing system about which of his previous selections in a current data processing session have disabled, or otherwise "affected", selections which would ordinarily be selectable. Control of the data processing system is managed by listing the selections available to the user on series of menus presented on the display means. A CPU instructs the display means to display the menu which corresponds to that particular point in the program. Following the method of the present invention, the CPU has kept track of the selections made by user. By referring to a special data file which correlates or compares these past selections to the list of actions displayed in the current menu, the CPU determines which of these actions are "affected". These affected actions are then denoted on the menu in some way, e.g., changing the affected action's color, marking the affected actions with a special symbol, etc. Responsive to the user placing the input focus on an affected action, the CPU presents a list of the past selections which cause the action to be affected on the display means, One preferred embodiment of the invention would allow a user to deselect the past selections which cause the action to be affected, and thereby transform the affected action to an unaffected action. The user could then perform the desired action with the remaining past selections.

19 Claims, 6 Drawing Sheets

| OBJECT \ ACTION | OPEN | NEW | COPY | MOVE | DISCARD | SEND |
|---|---|---|---|---|---|---|
| SEARCH PATTERN | X | X | X |  | X |  |
| NOTE | X | X | X | X | X | X |
| PAPER REFERENCE | X | X | X |  | X | X |
| SPREADSHEET | X |  |  | X | X | X |
| SEARCH RESULT | X |  |  |  | X |  |

FIG.9

MENU DRIVEN AND METHOD SYSTEM FOR INFORMING WHICH PAST SELECTIONS HAVE CAUSED DISABLED ACTIONS

CROSS REFERENCE TO RELATED APPLICATION

This application is a continuation of application Ser. No. 07/511,130, filed Apr. 19, 1990, entitled Conditional Look Ahead Valid Option Determination, now abandoned.

BACKGROUND OF THE INVENTION

Field of the Invention

This invention relates generally to menu driven interactive data processing systems. More particularly, it relates to a method to prevent a user from attempting to perform actions which will definitely fail and informing the user which of previously selected options will cause those actions to fail.

Background Art

In modern data processing systems, an attempt is usually made to write software which helps control those systems to allow their operation in a "user-friendly" manner. A typical method of writing user friendly software is to provide a series of menus which include lists of the actions which are selectable by a user at a particular place in the program. Such programs are popular because human factors studies have shown that it is easier for users to recognize and select desired items from a list on a display screen, rather than having to remember numerous and lengthy commands to operate the data processing system. When a user desires to select a particular item or action, he moves the input focus of the system to the selected item with the aid of cursor direction keys or a pointing device, such as a mouse and transmits an input to the system via a keyboard or mouse button. The input focus of the system is generally identical to the current cursor position.

As software grows in complexity, many actions may be "affected", i.e., disabled, by choices already made by the user during the data processing session. If these affected actions are left on the menu, a user may select such an affected action which will fail to execute. The data processing system will then flash an error message to the user indicating that the action cannot be accomplished. It would be advantageous to inform a user in advance that a particular action is affected, and therefore, not to attempt the action. This avoids tying up the data processing system with unfruitful requests and error messages.

In menu driven software, the prior art has utilized two methods of preventing a user from selecting such affected actions. A first method is to only include those actions which are unaffected, i.e., not disabled, and properly selectable by the user in the menu. In this method, affected actions are simply left off the menu. A disadvantage of this first method is that a user who remembers that a particular action could be selected at this place in the program when he had made different previous choices will become confused, believing that he is at a different place in the program. This may lead to a search for the affected action in other menus, wasting the user's time and increasing his dissatisfaction with the software.

A second method employed in the art is to highlight actions which are selectable in the menu, i.e., leaving the affected actions in a de-emphasized state. This is an improvement over the first method in that the user is not likely to be confused about his place in the program. However, the user has no way of understanding which of his previous selections have caused the action to be affected without referring to documentation.

SUMMARY OF THE INVENTION

It is, therefore, a primary object of this invention to inform a user about past selections which have affected a particular action on a menu.

It is further object of this invention to prevent a user from attempting actions which will fail to execute.

These and other objects, features and advantages of the invention are accomplished by the method for displaying the effect of past actions on present affected actions, as disclosed herein.

The method is practiced in a data processing system which includes a central processing unit (CPU), a random access memory (RAM), a means of inputting user selections such as a keyboard and a mouse and a means of displaying the results of such selections to the user. A plurality of program modules and data objects are resident in the memory. The invention is designed to control the data processing system by listing the possible selections in a series of menus presented on the display means.

While operating the data processing system according to the instructions in one of the program modules, the CPU will instruct the display means to display the menu which corresponds to that particular point in the program. Following the method of the present invention, the CPU keeps track of the past selections made by the user. By referring to a data file which correlates or compares these past selections to the list of actions displayed in the menu, the CPU determines which of these actions are affected. These affected actions are then denoted on the menu in some way, e.g., changing the affected action's color, marking the affected actions with a special symbol, etc. Responsive to the user placing the input focus on an affected action, the CPU presents a list of the past selections which cause the action to be affected on the display means. One preferred embodiment of the invention would allow a user to deselect the past selections which cause the action to be affected (disable), and thereby transform the affected action to an unaffected (executable) action. The user could then perform the desired action with the remaining past selection is.

BRIEF DESCRIPTION OF THE DRAWINGS

These and other objects, features and advantages of the invention will be more fully appreciated with reference to the accompanying drawings.

DETAILED DESCRIPTION OF THE INVENTION

Figure 1:
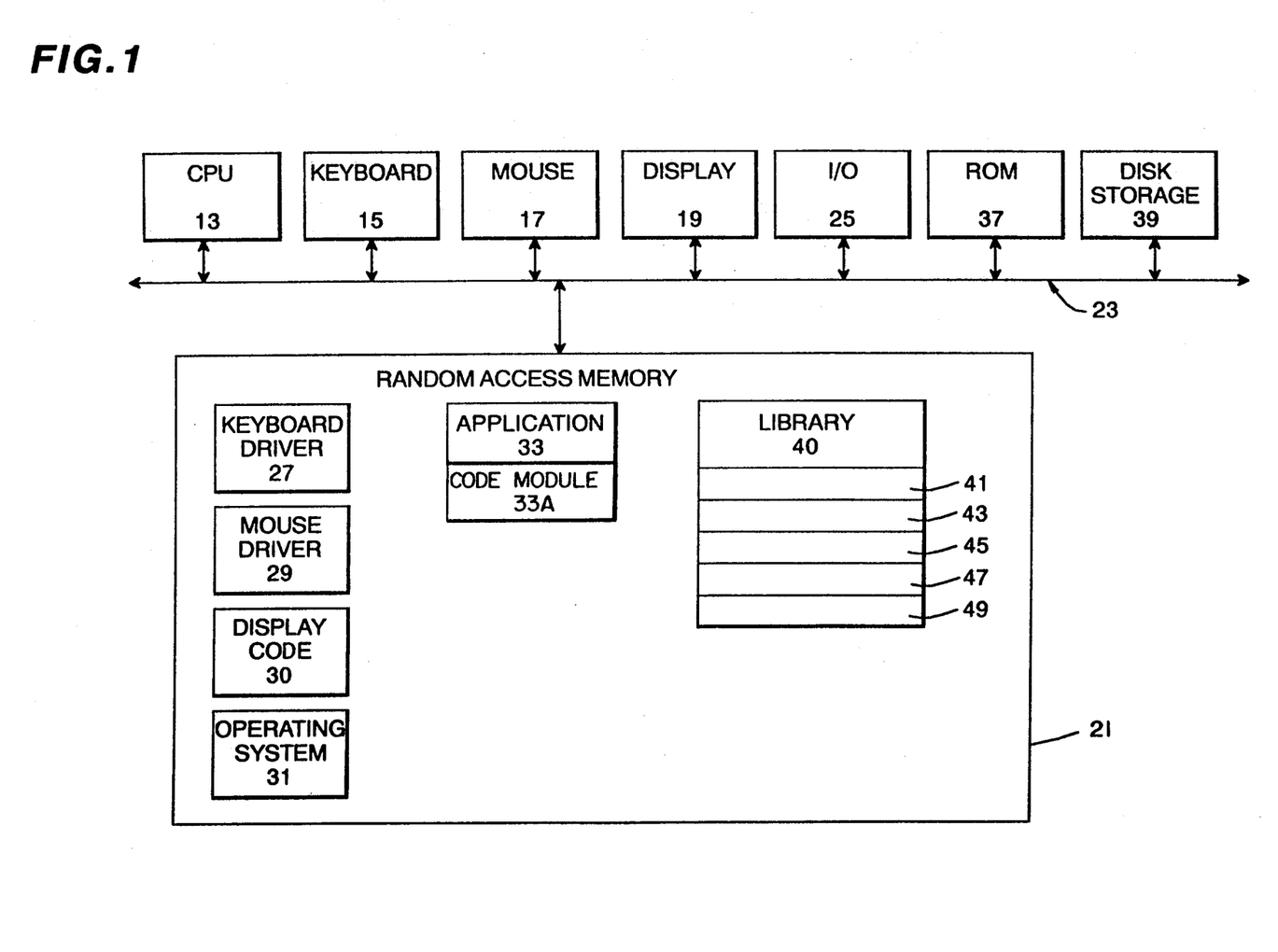
FIG. 1 shows a system block diagram of a data processing system which operates according to the principles of the present invention.

The data processing system shown in FIG. 1 includes a central processing unit (CPU) 13, a keyboard 15, a mouse 17 and a display unit 19 all of which are coupled to each other and to the random access memory 21 by means of a system bus 23. Other types of pointing devices could be used in place of the mouse 17, such as a touch sensor. The memory 21 contains a number of program modules including a keyboard driver 27 which interprets the electrical signals sent by the keyboard 15, a mouse driver 29 which interprets the electrical signals sent by the mouse 17, display code 30 which controls the presentation of information to the user on the display 19 and an operating system 31 which provides a set of general instructions for the CPU 13 to control data transfer throughout the data processing system. The memory 21 further includes an application program 33, code module 33A and library 40 which contains a number of data files or objects 41, 43, 45, 47, and 49 can be selected by the user for manipulation by the application program 33. Code module 33A contains the set of instructions used by the processor 13 separated from the rest of the application program 33. The library 40 could contain hundreds of data files, however, only five are illustrated in the figure. Other input/output devices can be connected via the I/O port 25 to the remainder of the data processing system. Also coupled to the system bus 23 are the read only memory (ROM) 37 and disk storage 39.

The data processing system depicted in FIG. 1 could be controlled by an IBM System 370 type host central processor connected to a number of individual workstations (not shown). The invention can also be implemented in a stand-alone processor such as a personal computer, e.g., the IBM PS/2 TM computer. The invention is particularly appropriate in an application 33 called Library Drawer which handles data files 41, 43, 45, 47 and 49 which possess differing characteristics. Some actions programmed into the application 33 may be carried out on some data files but not others. In the preferred embodiment, the library 40 contains several types of data files: paper references, search patterns, notes, spreadsheets and search results. A paper reference is a data file that "points" to an actual hardcopy of a document. It has no actual content—it consists only of descriptors. Descriptors are attributes, or properties of an object or file. Typical descriptors include "name", "description", "class", "author", and "owner". Content is analogous to a PC flat file or ASCII text. Content is a term for the actual bits stored in a data file, e.g., the bits associated with the characters "a", "p" and "e" in the word "ape". A search pattern is a data file consisting of search criteria used to find other data files in the library. The search criteria are mainly matched against another object's descriptors. This object, like all other objects in the library 40, contains descriptors which apply to it. A search result is an object consisting of descriptors, search criteria, and the results of a search using the stored search criteria that is a part of this object. Documents, Notes, Memos are different versions of standard text objects. These consist of both descriptors and content.

Library drawer 33 can work with search patterns, search results, or other data files in the library 40. Library drawer 33 first displays all items to which the user has access in the menu panel depicted in FIG. 2. The types or classes of objects chosen by the user and depicted in the menu panel can include any of the documents, notes, search patterns, search results, paper references, and other files found in the library 40. For example, the user may choose to look only at data files that have shared characteristics or properties by performing a search of the library 40. Library drawer 33 will create or edit search patterns to specify the search criteria and perform a search and show the results in a search result.

Different actions within Library drawer 33 which are selectable by the user include:

File    To work with objects or change their properties
View    To change how the list of objects in this window is displayed.
Utilities    To check objects into or out of the Library or to invalidate their checkout.
Help    To get online contextual help or extended help.

In the preferred embodiment, actions have subactions. Some examples of subactions of the action "File" include "Move", "Copy" and "Send". "Move" is used to move the data files selected from the Library 40 to another location, either in the RAM 21 or other on storage media such as hard disk 39. "Move" can give the file new names or keep their current names. The files and their properties are erased from the Library 40 when they are moved. According to the rules of Library drawer 33, the user cannot move paper references, search patterns, or search results from the Library 40. "Copy" is used to copy file within the Library 40 or from the Library 40 to another location. "Copy" can give the items new names or keep their current names. The user cannot copy paper references or, search patterns, to a location outside the library 40, and can not copy search results at all. "Send" is used to send copies of the selected file to other users. In Library drawer 33, the user cannot send search patterns, or search results to other users.

Figure 2:
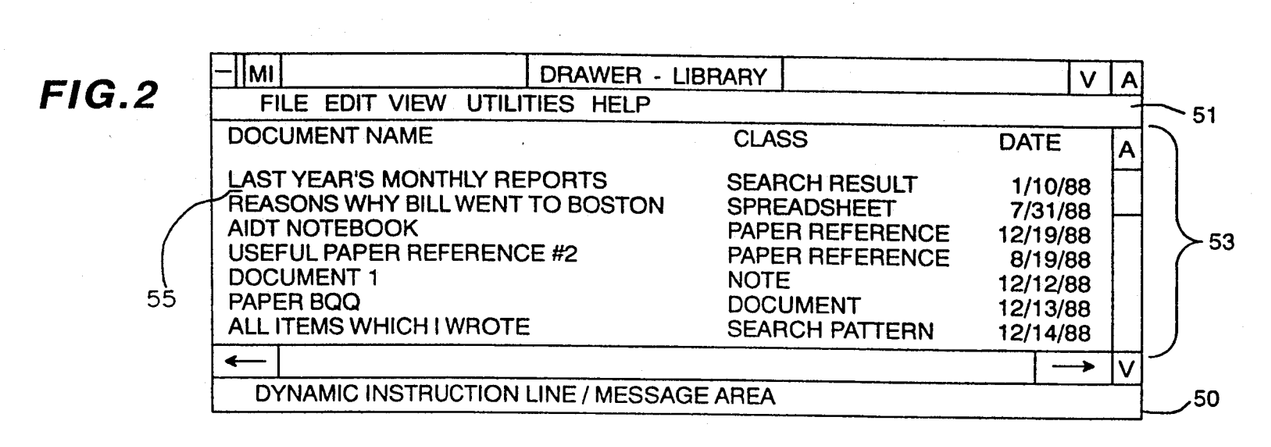
FIG. 2. shows an example of a display screen menu which includes a menu bar of possible actions and a list of selectable data file objects before any objects are selected.

FIG. 2 depicts a sample menu 50 presented to the user on display 19 while CPU 13 utilizes instruction from the operating system 31 and Library drawer 33 to operate on the data files contained in the Library 40. The menu 50 displays the actions available to the user on action bar 51 as well as a list 53 of data files available to be selected by the user. The list 53 of data file names corresponds to the data files 41–49 depicted in FIG. 1. Also included in FIG. 2 is the class of each data file and the date on which it was last revised. The input focus or cursor position 55 is shown as a single underline character. Although the sample menu portrayed depicts only seven data files for purposes of illustration, in actual use the Library 40 could contain hundreds of files. The user would access additional files by scrolling through the list of data files 53, for example, by repeatedly depressing a function key, until the desired data files had been displayed in the menu 50.

Figure 3:
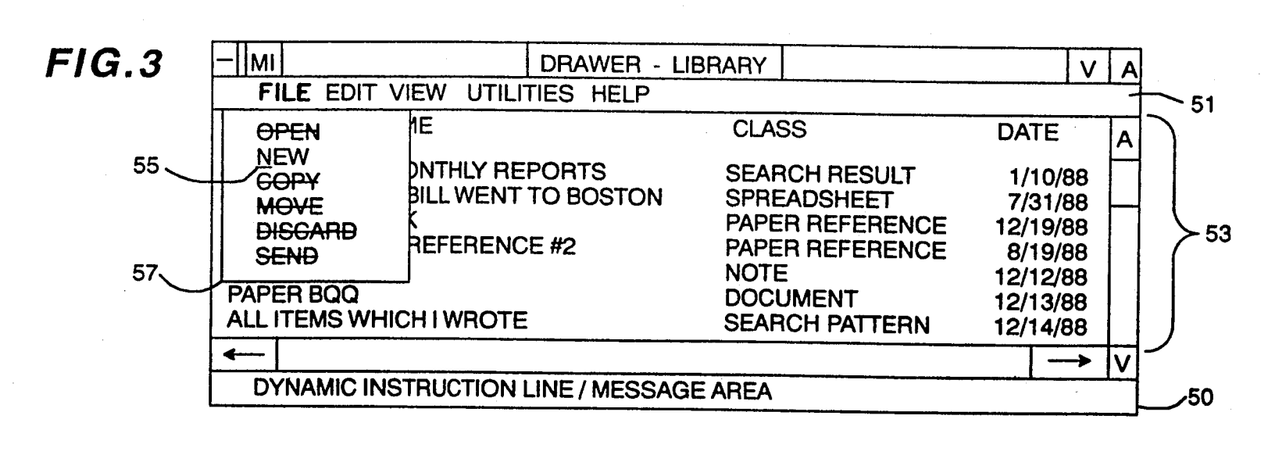
FIG. 3. shows the menu in FIG. 2 with a pull down action bar showing selectable and nonselectable subactions.

In FIG. 2, no data files have been selected by the user. Consequently, no action can be said to be "affected" by the past choices of the user. Nonetheless, when no data files have been selected, certain actions can not be performed. As shown in FIG. 3, when the input focus 55 of the system is moved to one of the actions in the action bar 51, for example, "File", the action is emphasized and a pull down action bar 57 appears which lists the selectable subactions of "File" in bold, while the nonselectable subactions are shown crossed out. Other methods of denoting the distinction between the two types subactions would be obvious to one skilled in the art.

Figure 4:
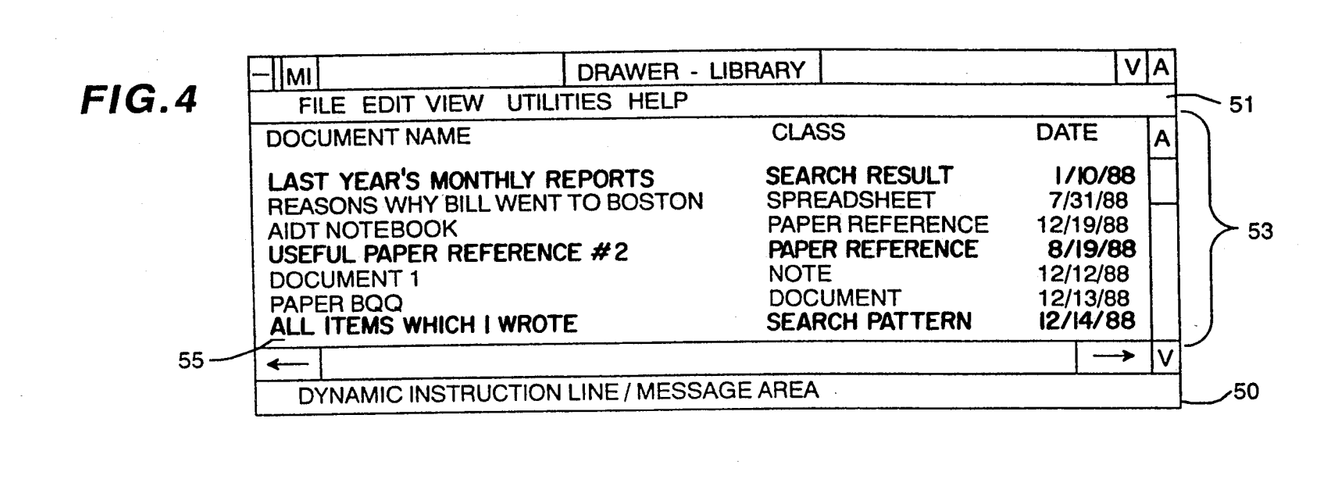
FIG. 4. shows an example of display screen menu which includes a menu bar of possible actions and a list of selectable data file objects where some of those objects are selected by the user.

FIG. 4 shows the sample menu 50 presented on the display 19 after several of the data files in list 53 have been selected by the user. The selected data files are shown in bold. The user selects a data file for manipulation by the application program 33 by moving the cursor 55 to the line of the data file and causing an input to be transmitted to the data processing system. In the preferred embodiment, this is accomplished through the use of a mouse 17 by clicking a mouse button once the cursor 55 is properly positioned. A user can deselect a data file by moving the cursor 55 to a emphasized item and then clicking a mouse button.

In FIG. 4, none of the actions in the action bar 51 are shown to be affected, despite the fact that a number of data files have been selected which are affecting the subactions of the action. This is a design decision made in the preferred embodiment. Since the user must first move the cursor to the action to execute the desired subaction, the user will be informed at that time that the desired subaction is affected. Most actions will have a mixture of affected and unaffected subactions once a number of data files are selected. In the preferred embodiment, it might be confusing to show that all the actions are affected. The user might be misled to believe that none of the actions are executable, when in fact only one or two subactions under each action are affected. In a different menu format, where the actions do not have subactions, it would be appropriate to cross out the action as it is affected. In a menu format where actions do not have subactions, the actions will change from bold to crossed-out to bold as various data files are selected and deselected. In one embodiment of Library drawer 33 as illustrated in the accompanying figures, actions in the action bar 51 become crossed out only when all their subactions are affected.

Figure 5:
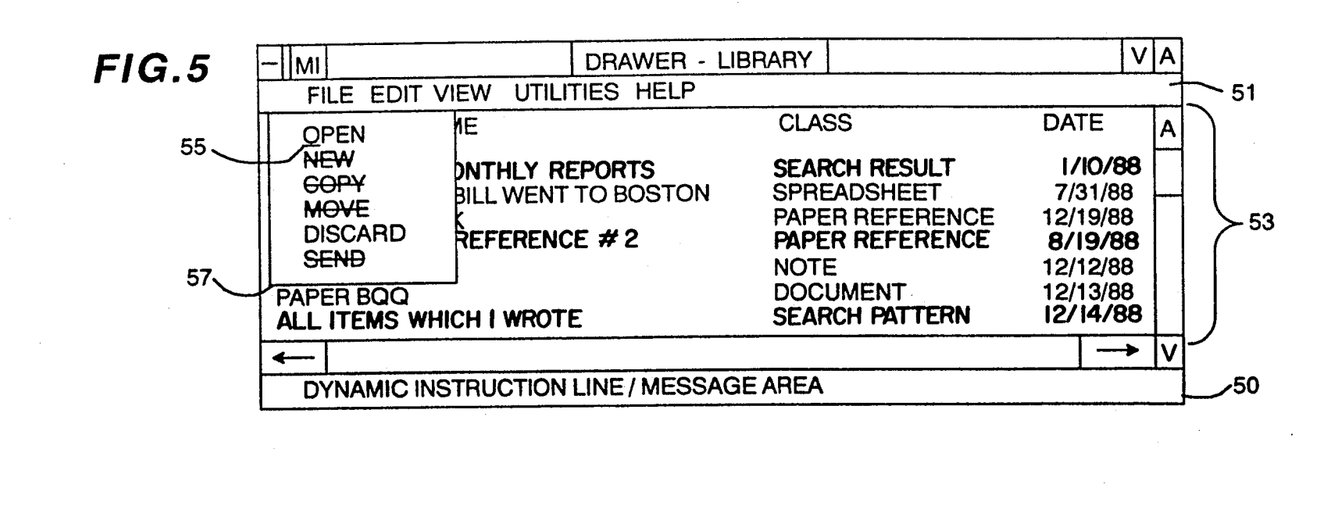
FIG. 5. shows the menu in FIG. 4 with a pull down action bar showing affected and unaffected subactions.

In FIG. 5, shows the menu in FIG. 4 when the cursor 55 is placed on an action bar 51. When this input from the user is received by the data processing system a pull down action bar 57 appears. In pull down action bar 57, the subactions which are affected are crossed-out, while those which remain unaffected are shown in normal type. As data files are selected to be acted upon, the subactions which can not be performed on all types of data files selected will be crossed out in the pull down action bar 57.

Figure 6:
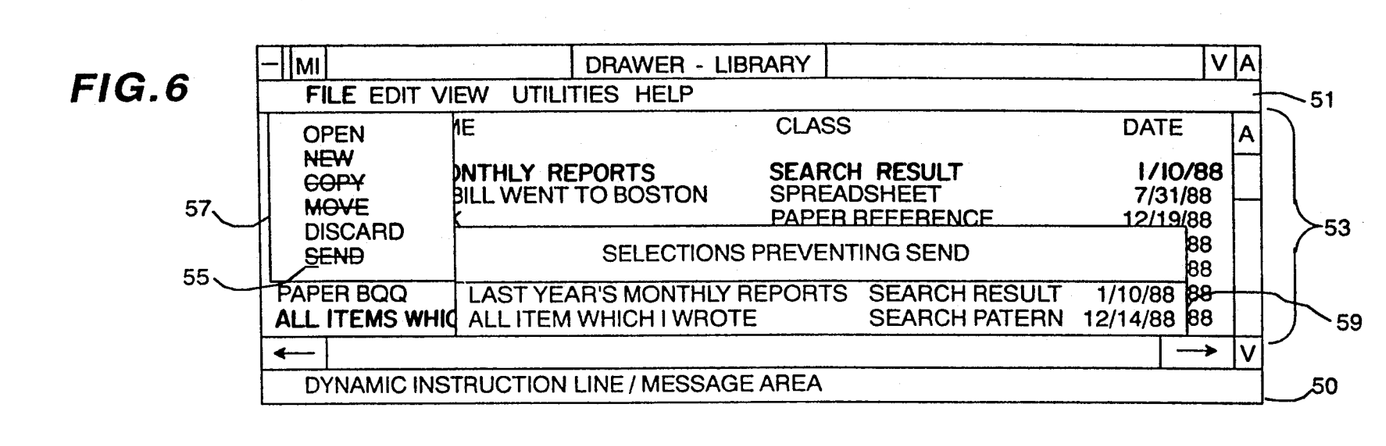
FIG. 6. shows the menu in FIGS. 4 and 5 with a pop-up window of the past selections which are causing a subaction to be affected.
Figure 7:
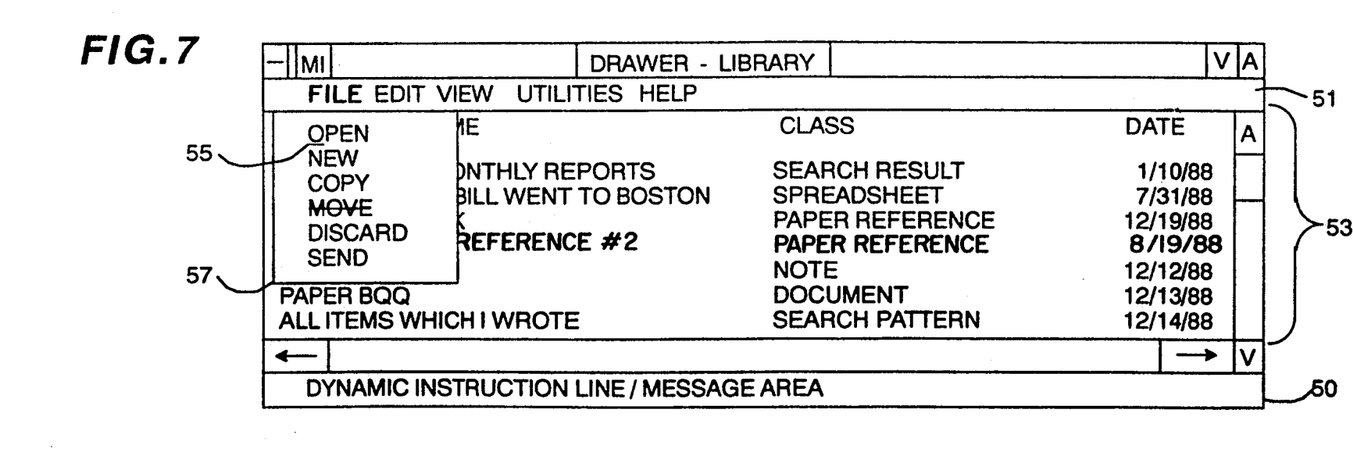
FIG. 7. shows the menu in FIG. 4 with a pull down action bar showing the subactions after past selections affecting one of the subactions have been deselected.

When the input focus e.g., cursor 55, of the system is on an affected subaction in the pull down action bar 57, a pop-up window 59 containing the list of the selected data files which are causing the subaction to be affected as displayed. This is shown in FIG. 6. The input focus of the system can be placed in the action bar 51 or the pull down action bar 57 by using either the keyboard or the mouse. The advantage of showing the pop-up window 59 of the selected data files is that the user gains an understanding of which of his past selections has affected the subaction, and therefore, if he wants to implement the subaction in the future, he will avoid choosing selections of the same data type. One preferred embodiment of the invention allows the user to deselect the past selections which cause the subaction to be affected. It is preferred to allow the user to deselect the data files by moving the cursor to the data files listed in pop-up window 59, and clicking the mouse button. In a less preferred embodiment, the user could return to the menu of FIG. 4 and deselect by moving the cursor to the selected data files in list 53 and clicking a mouse button. After the past selections in the pop-up window 59 have been deselected, the subaction goes from affected to unaffected. The user could then perform the subaction with the remaining past selections. FIG. 7 shows the menu 50 in FIG. 4 with the pull down action bar 57 showing the subactions after the past selections affecting the subaction have been deselected.

Figure 8:
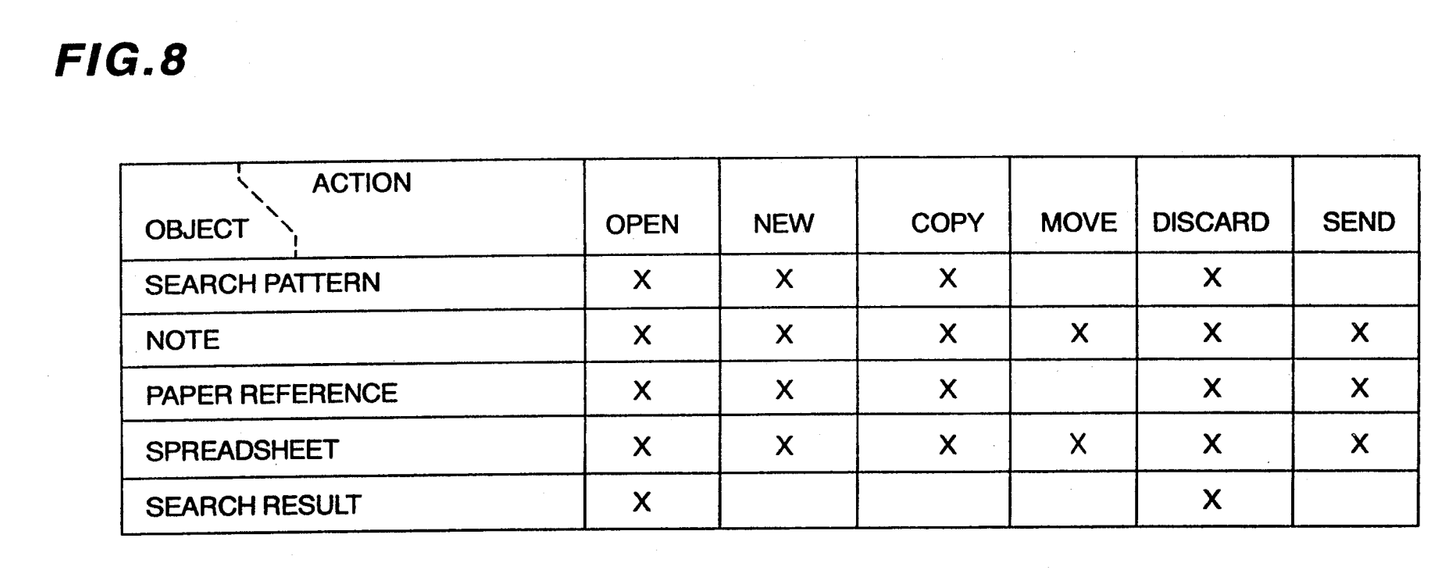
FIG. 8. is a matrix of a first set of possible selections mapped against a second set of possible selections which describes if a file can be sent from a member of the first set of possible selections to a member of the second set.

FIG. 8 depicts a matrix which contains information on which objects or data files are incompatible with the subactions of "File". The data files are listed vertically in the matrix, and the subactions are listed horizontally. A blank is present when a particular subaction is affected when a data file of a given type is selected. As shown in FIG. 8, when a search pattern is chosen, both "Move" and "Send" are affected. Similarly, when a paper reference is selected, only "Move" is affected. No actions are affected by the selection of a note or spreadsheet. The information in the matrix is held in a special data file. In the preferred embodiment, the data is held in a bit stream after a descriptor indicating a particular class of data file. The first column might indicate whether the subaction "open" was affected by the selection of that class of data file, the second column might indicate whether the subaction "new" was affected by the selection of that class of data file. A "1" would indicate that the subaction was selectable; a "0" would indicate that the subaction was affected or disabled. For example, the bit stream after the descriptor for search pattern in FIG. 8 would be "111010". After all the objects are selected by the user, the CPU logical "ANDs" the bit streams together. Thus, any of the subactions affected by any of the past selections would be indicated by a "0". Similar matrices are stored for the subactions of the other actions in the action bar 51.

Figure 9:
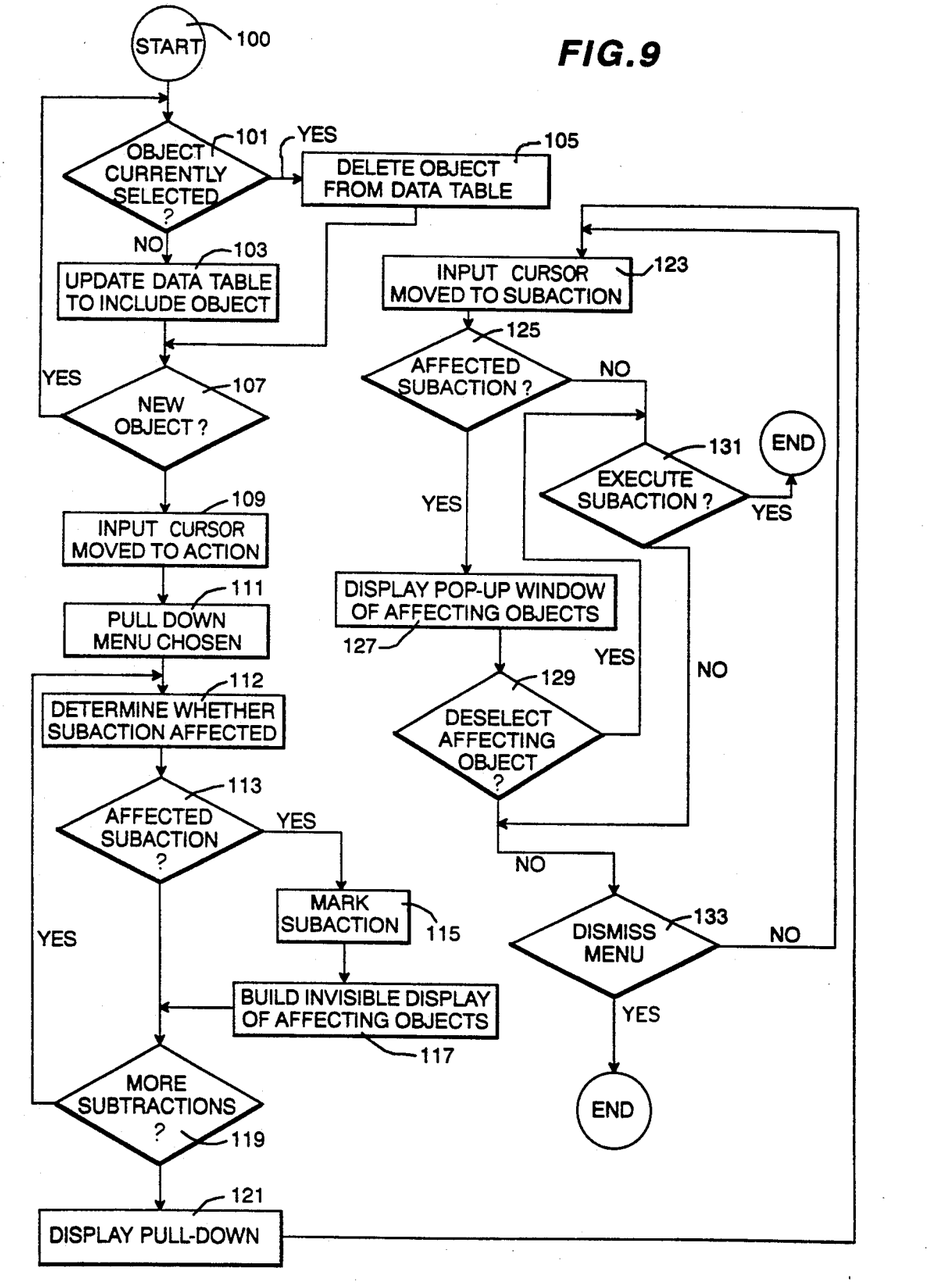
FIG. 9. is a flow diagram of the logical operations performed in the method of the invention.

FIG. 9 depicts a flow diagram of the operation of the invention according to a preferred embodiment. The flow diagram starts with the user being presented a list of object or data files like that shown in FIG. 2 from which he can select or deselect object in step 101. In step 101, the user has input a mouse click to the data processing system while the cursor is on one of the objects in list 53. The CPU then determines whether the object is selected or unselected. If not, the cursor is on an unselected object and when a mouse button is depressed the object is thereby selected. If the object goes from unselected to selected, the method continues to step 103 and updates a data table to reflect that the object has now been selected. The user may continue to select objects by moving the cursor to a new object in step 107 or may decide that he is finished selecting objects and the method progresses to step 109. If an object goes from selected to deselected, that object's information is removed from the data table in step 105. Other selected objects may be deselected by moving the cursor to a new selected object and inputting a signal to the system to deselect the object in step 107. As the objects are selected or deselected, the menu is continually updated so that the selected object names are in bold relative to deselected object names.

The user then moves the input focus to an action in the action bar 51 in step 109. The pull down action bar 57 associated with the selected action is chosen in step 111. However, before the data processing system displays the pull down action bar 57, it determines whether each subaction in the pull down action bar 57 is affected in step 112. The data processing system performs this determining step 112 by correlating the data table of previously selected objects built in steps 103 and 105 above with the subaction, and refers to the previously programmed information in the special data file depicted in FIG. 8 in step 113. If the subaction is affected, the subaction is marked in step 115 and an invisible display of the objects which cause that subaction to be affected is built and associated with that subaction in step 117. The system then determines whether there are any more subactions in the pull down action bar 57 in step 119 and repeats the process until it determines which subactions are affected or unaffected. The pull down action bar 57 is then displayed to the user in step 121.

The user then moves the input focus to a subaction in the pull down bar 57 in step 123. If the subaction is affected, step 125, the system displays the heretofore invisible pop-up display 59 of the objects which are causing the action to be affected. Next, the user will have the option of deselecting the affecting objects, step 129, and execute the now unaffected subaction, step 131. Alternatively, the user can opt not to deselect any objects and either move the input focus to another subaction, step 123, or dismiss the menu entirely, step 133. The preferred means of deselecting the selected objects is to move the input focus of the system to the affecting object and depress a mouse button. If the subaction is unaffected in step 125, the user has the options of executing the subaction, step 131, moving the input focus to another subaction, step 123, or dismissing the menu, step 133. The set of instructions contained in code module 33A which are held in memory 21, together with the processor 13 which carriers out these instructions provide a means for determining which user selections have disabled a disabled action, a means for establishing the selections list containing past selections and the means for indicating to the user which of the past selections have disabled an action. These means may also employ the display 19, the keyboard 15, the mouse 17 and their associated drivers as well as the display code 30 and operating system 31.

The cursor can be placed in the action bar 51 or in a pull down menu 59 by either using the cursor direction keys on the keyboard or the mouse. In either case, the data processing system knows that the cursor 55 is on the menu and will notify the application that it has the input focus, by sending messages already programmed into the operating system 31. For example, in an OS/2 and Presentation Manager environment the CPU 13 notifies the application program 33 that it has the input focus by sending a WM-INITMENU message. In response, the application 33 builds the menu 50, and any invisible menus such as the pull down action bar 57 and the pop-up display 59 and then transfers control of the system back to the operating system 31. The user then moves the input focus of the system via mouse or keyboard. The CPU 13 then notifies the application about the change in location of the cursor via a WM-MENUSELECT message. In response, the application 33 sends one of the invisible menus to the CPU 13 for presentation on the display 19, and transfers control back to the operating system. As the user continues to move the cursor about the menu, a steady stream of WM-MENUSELECT messages are sent to the application 33. When the user has finished with the application 33, the operating system 31 and CPU 13 notify the application 33 by sending a WM-ENDMENU message. The application 33 then destroys the built up images of the various menus. The particular action is determined by issuing WM-QUERYITEM messages, and if it is an affected menu action, then display the list of affected objects.

The following is a pseudocode description of the logic behind this process. The actual code will be part of a window procedure that manages a menu which contains, at a minimum, a list of selectable objects, and a menu containing actions which can be performed on those objects.

```
Procedure ListPanelWndProc (window_handle, message, data1, data2)
BEGINPROC
    CASE (message):

. /* other logic not associated with patent subject */

CASE WM_INITMENU:
        BEGIN
            IF (selected objects are invalid for some subactions) THEN
            BEGINIF
                Disable (grey-out) those subactions;
                Build invisible windows with lists of invalid selections
                    for each disabled subaction;
            ENDIF
        END
    CASE WM_MENUSELECT:
        BEGIN
            IF (a disabled subaction is losing input focus) THEN
                Make displayed window of invalid selections invisible;
            IF ( input focus is now on disabled subaction) THEN
                Make window containing invalid selection visible;
        END
    CASE WM_MENUEND
        BEGIN
            Destroy windows with lists of invalid selections for disabled
                subactions;
```

```
    END
CASE (message):
    .
    . /* other logic not associated with patent subject */
ENDPROC
```

Those skilled in the art would recognize that there are a plethora of ways of distinguishing between affected and unaffected actions on a display screen. The two types of actions could be displayed in different colors, one type of action could be displayed in different colors, one type of action could be in reserve video or marked with any of a variety of symbols. The choice of crossing out the affected actions as opposed to the other available methods of denoting the affected action was simply a design choice in the preferred embodiment.

Although a specific embodiment has been disclosed, it will be understood by those skilled in the art that changes can be made to the specific embodiment without departing from the spirit and scope of the invention. For example, in the preferred embodiment above, the "past selections" are data files or data objects which affect one or more actions which would normally be selectable by a user at a particular menu. The present invention would also cover a data processing system in which the "past selections" are actions taken by the user prior to the menu which displays the affected actions. The specific embodiment disclosed is for purposes of illustration only and is not to be taken to limit the scope of the inventions narrower than the appended claims.

Also, there are other means available in the prior art, to determine which of the past actions are affected in addition to correlating of a list of past selections to a data file as presented in the embodiment above.

We claim:

1. In a data processing system including a processor, a memory, display means and input means coupled together by means of a system bus, a method comprising the steps of:

establishing a selections list containing a plurality of selections in the memory which have been selected by a user;

updating the selections list in response to selection or deselection by the user;

determining whether any of the selections contained in the selections list have disabled any action in an actions list containing a plurality of actions;

displaying a menu on the display means, the menu containing at least one disabled action, the disabled action being displayed in a manner which indicates that the disabled action is disabled; and, indicating which of the selections contained in the selections list have caused the disabled action to be disabled in response to the user moving a cursor to the disabled action;

wherein the steps are performed by the processor according to a set of instructions stored in the memory and with user input received from the input means.

2. The method as recited in claim 1 wherein the determining step comprises the step of comparing the selections list and the actions list against a data file stored in the memory which indicates which of the actions contained in the actions list are disabled by the selections contained in the selections list.

3. The method as recited in claim 1 wherein the indicating step further comprises the step of displaying a second selections list containing the selections which have caused the disabled action to be disabled.

4. The method as recited in claim 1 wherein each selection contained in the selections list is a name of a data file where the data file is resident in the memory.

5. The method as recited in claim 1 wherein both disabled and executable actions are displayed on the menu.

6. The method as recited in claim 1 wherein the menu containing at least one disabled action is a pull down menu from an action bar, the pull down menu containing an action in the action bar, and the disabled action is a subaction of the action in the action bar.

7. The method as recited in claim 3 which further comprises the step of changing a selection which is causing the disabled action to be disabled from a selected state to a deselected state from the second selections list, thereby changing the disabled action to an executable action.

8. The method as recited in claim 1 wherein the indicating step is initiated by the step of moving the cursor to the disabled action by manipulating a mouse pointing device.

9. The method as recited in claim 1 wherein the indicating step is initiated by the step of moving the cursor to the disabled action by manipulating a set of cursor control keys on a keyboard.

10. A data processing system for informing a system user which of a plurality of selections made by the system user have disabled an action in a menu presented to the user comprising:

a memory for storing program modules and data files;

a processor coupled to the memory by means of a system bus the processor operates the data processing system according to instructions in the program modules stored in the memory;

means for establishing a selections list in memory, the selections list containing a plurality of selections which have been selected by the system user;

means for updating the selections list in response to a selection or deselection by the system user;

means for determining whether any of the selections contained in the selections list have disabled any action in an actions list containing a plurality of actions;

display means for displaying information to the system user coupled to the processing means and the memory by means of a system bus, the display means displaying the actions list in a menu including at least one disabled action displayed in a manner indicating its disabled state;

an input device for querying the data processing system as to the selections which are causing the disabled action to be disabled; and, means for indicating which of the selections have caused the disabled action to be disabled in response to the input means signaling that a cursor has been moved to the disabled action.

11. The system as recited in claim 10 wherein each selection contained in the selections is a name of a data file where the data file is resident in the memory.

12. The system as recited in claim 10 wherein both disabled and executable actions are displayed in the menu.

13. The system as recited in claim 10 wherein the menu containing at least one disabled action is a pull down menu from an action bar, the pull down menu containing subactions of an action in the action bar, and the disabled action being a subaction in the pull-down menu.

14. The system as recited in claim 10 which further comprises a means for changing a selection which is causing a particular action to be disabled from a selected to a deselected state from a section selections list which have caused the action to be disabled, thereby changing the disabled action to an executable action.

15. In a data processing system including a processor, a memory, display means and input means coupled together by means of a system bus, a method comprising the steps of:
- establishing a selections list containing the plurality of selections in the memory which have been selected by a user;
- updating the selections list in response to selection or deselection by the user;
- determining whether any of the selections contained in the selections list have disabled any action in an actions list containing a plurality of actions by comparing the selections list and the actions list against a data file stored in the memory which indicates which of the actions contained in the actions list are disabled by the selections contained in the selection list;
- displaying a menu on the display means, the menu containing at least one disabled action, the disabled action being displayed in a manner which indicates that the disabled action is disabled; and,
- indicating which of the selections contained in the selections list have caused the disabled action to be disabled in response to the user moving a cursor to the disabled action by displaying a second selections list containing the selections which have caused the disabled action to be disabled;
- wherein the steps are performed by the processor according to a set of instructions stored in the memory with user input received from the input means.

16. The method as recited in claim 15 wherein each selection contained in the selections list is a name of a data file where the data file is resident in the memory.

17. The method as recited in claim 15 wherein both disabled and executable actions are displayed in the menu.

18. The method as recited in claim 15 wherein the menu containing at least one disabled action is a pull down menu from an action bar, the pull down menu containing subactions of an action in the action bar, and the disabled action is a subaction in the pull down menu.

19. The method as recited in claim 15 which further comprises the step of changing a selection which is causing a particular action to be disabled from a selected to a deselected state from the second selections list, thereby changing the disabled action to an executable action.

* * * * *